(12) United States Patent
Chan et al.

(10) Patent No.: US 7,984,209 B1
(45) Date of Patent: Jul. 19, 2011

(54) DATA INTERFACE METHODS AND CIRCUITRY WITH REDUCED LATENCY

(75) Inventors: Vinson Chan, San Jose, CA (US); Michael Menghui Zheng, Fremont, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 982 days.

(21) Appl. No.: 11/638,150

(22) Filed: Dec. 12, 2006

(51) Int. Cl.
*G06F 3/00* (2006.01)
*G06F 5/00* (2006.01)

(52) U.S. Cl. .................. 710/52; 710/54; 710/58; 711/1; 711/167; 375/372

(58) Field of Classification Search ...................... 710/52
See application file for complete search history.

(56) References Cited

U.S. PATENT DOCUMENTS

| | | | | |
|---|---|---|---|---|
| 4,941,156 A * | 7/1990 | Stern et al. | ...... | 375/372 |
| 5,255,293 A * | 10/1993 | Archer et al. | ...... | 375/372 |
| 5,396,492 A * | 3/1995 | Lien | ...... | 370/412 |
| 5,621,775 A * | 4/1997 | Etienne | ...... | 375/372 |
| 5,781,597 A * | 7/1998 | Owen et al. | ...... | 375/372 |
| 5,822,327 A * | 10/1998 | Satou | ...... | 370/505 |
| 6,757,348 B1 * | 6/2004 | Vila et al. | ...... | 375/372 |
| 7,227,876 B1 * | 6/2007 | Cochran et al. | ...... | 370/509 |
| 7,298,808 B1 * | 11/2007 | Rey | ...... | 375/372 |
| 2001/0055276 A1 * | 12/2001 | Rogers et al. | ...... | 370/232 |
| 2006/0188052 A1 * | 8/2006 | Mochizuki et al. | ...... | 375/372 |
| 2006/0230215 A1 * | 10/2006 | Woodral | ...... | 710/310 |
| 2007/0002991 A1 * | 1/2007 | Thompson et al. | ...... | 375/372 |

FOREIGN PATENT DOCUMENTS

EP 1130842 A2 * 9/2001

* cited by examiner

*Primary Examiner* — Henry W Tsai
*Assistant Examiner* — Steven G Snyder
(74) *Attorney, Agent, or Firm* — Ropes & Gray LLP

(57) ABSTRACT

Interface circuitry that is used to interface data between two different clock regimes that may have somewhat different speeds includes the ability to determine which of the clock regimes is faster. Depending on which clock regime is found to be faster, the baseline (nominal difference between data write and data read addresses of a FIFO memory in the interface circuitry) is shifted (i.e., toward the full or empty condition of the FIFO, as is appropriate for which of the clock regimes has been found to be faster). Adjustments may also be made to the threshold(s) used for such purposes as character insertion/deletion and overflow/underflow indication. This technique may allow use of a smaller FIFO and reduce latency of the interface circuitry.

17 Claims, 3 Drawing Sheets

US 7,984,209 B1

DATA INTERFACE METHODS AND CIRCUITRY WITH REDUCED LATENCY

BACKGROUND OF THE INVENTION

This invention relates to circuitry and methods for use in interfacing data between two clock regimes that may have somewhat different frequencies.

An example of a context in which the invention can be used is the reception of a high-speed serial data signal by a programmable logic device ("PLD") integrated circuit. The clock rate of the incoming data signal may be somewhat different from the clock rate that needs to be used on most of the PLD for processing the data. High-speed serial interface ("HSSI") circuitry may be provided on the PLD for performing such tasks as (1) recovering clock and data signals from the incoming data signal, (2) converting the data from serial to parallel form, and (3) buffering the parallel data between the clock rate that it had when received and the clock rate at which it will be further processed by the PLD. Typical parts of the buffering circuitry include (1) first-in/first-out ("FIFO") memory circuitry for storing successive incoming data words at the incoming clock rate and subsequently outputting those words at the PLD processing rate, (2) character insertion circuitry for inserting dummy characters into the FIFO output data if and when reading from the FIFO gets too close to writing to the FIFO, and (3) character deletion circuitry for deleting dummy characters from the FIFO output if and when writing to the FIFO gets too far ahead of reading from the FIFO.

Because some circuitry (such as PLD circuitry) is intended to be relatively general-purpose circuitry, it is typical for such circuitry to be designed to accommodate both the possibility that the read clock may be faster than the write clock and the possibility that the write clock may be faster than the read clock. This may lead to a design for the interface circuitry that has a relatively high latency (i.e., a relatively long delay between the reception of data by the interface circuitry and output of the same data from the interface circuitry). A reason for this characteristic of typical prior systems is that those systems do not attempt to determine which of the read and write clocks is faster in a particular situation, or to adapt the configuration of the interface circuitry depending on the relative speeds of those clocks.

SUMMARY OF THE INVENTION

In accordance with this invention the relative speeds of the write and read clocks are determined. The baseline of FIFO circuitry in the interface is then shifted depending on whether the read clock is faster or the write clock is faster. The baseline of a FIFO is the nominal number of FIFO locations that are expected to contain data that has been written into the FIFO but that has not yet been read from the FIFO. (Such data may sometimes be referred to as data in transit.) For example, if the read clock is found to be faster than the write clock, the baseline can be shifted toward (or even to) the full position or condition of the FIFO. On the other hand, if the write clock is found to be faster than the read clock, the baseline can be shifted toward (or even to) the empty position or condition of the FIFO. Appropriate adjustments can also be made to the thresholds that are applied to the difference between current write and read addresses and that are used for such purposes as to indicate when a character should be inserted or deleted and/or to indicate when an overflow or underflow condition has occurred. These techniques may allow a FIFO in accordance with the invention to be smaller in size and/or to have less latency than prior FIFOs serving the same need or range of possible needs.

Further features of the invention, its nature and various advantages, will be more apparent from the accompanying drawings and the following detailed description.

DETAILED DESCRIPTION

Figure 1:
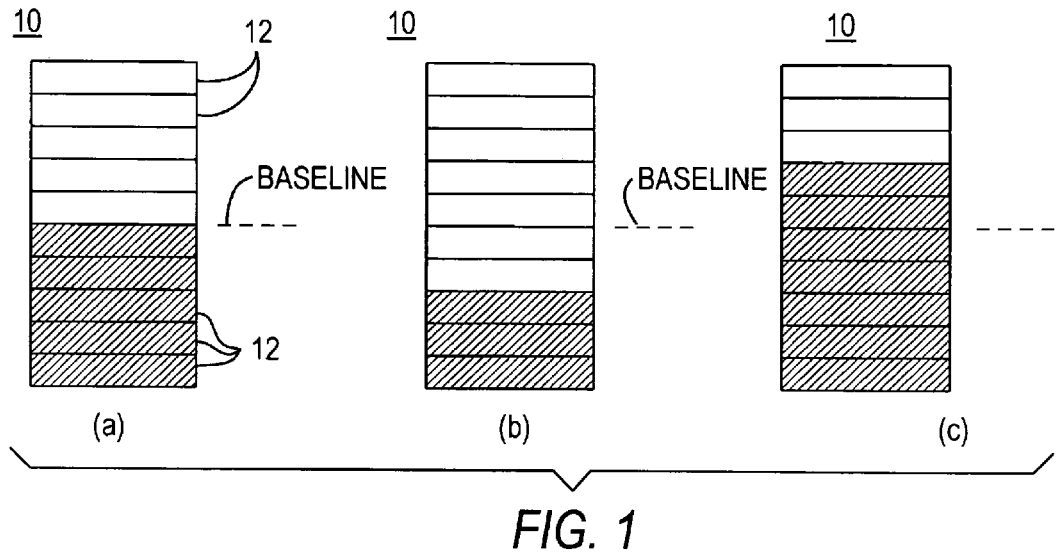
FIG. 1 illustrates operation of a typical FIFO under various conditions.

FIG. 1 illustrates operation of a typical FIFO memory 10 under various operating conditions. In the (a) part of FIG. 1, FIFO 10 is shown as having ten storage locations 12. This FIFO size is only an example, and it will be understood that FIFO 10 can be larger or smaller as desired and/or needed. In FIG. 1 and similar subsequent FIGS. FIFO locations 12 that are shaded may be thought of as containing data that has been written into the FIFO but that has not yet been read from the FIFO. It is important to realize that FIGS. of this type do not necessarily indicate which particular storage locations 12 contain as-yet-unread data. Rather, this type of FIG. may only illustrate quantitatively how many storage locations 12 contain as-yet-unread data. Data may actually be written into storage locations 12 from top to bottom (or from bottom to top) in a repeating series, with data being read from storage locations 12 in the same order but after some delay. This delay is the current latency of the FIFO. The number of shaded storage locations 12 in FIG. 1 and similar FIGS. indicates how far apart the data write address and the data read address currently are. The data write address increments (or decrements) at the write clock rate. The data read address increments (or decrements) at the read clock rate. If the read and write clock rates are the same, the number of storage locations 12 containing as-yet-unread data will remain relatively constant at what may be called the baseline of the FIFO. The baseline is the number of storage locations 12 that the circuitry has been set up to hold, as-yet-unread, in situations in which the write and read clocks have the same rate.

The (b) portion of FIG. 1 illustrates what happens if the read clock is faster than the write clock. In particular, portion (b) of FIG. 1 shows that the number of as-yet-unread data items in FIFO 10 has fallen below the baseline number. This is because the read address is catching up to the write address. Unless something is done, the FIFO will eventually become empty (an underflow condition), which is generally regarded as unacceptable. Underflow occurs when the read address catches up to or becomes unacceptably close to the write address. To prevent this, when the read address comes to within a first threshold of closeness to the write address, a dummy character (or characters) can be inserted into the data stream from the FIFO, while changing of the read address is temporarily halted. (This is just one example of how character insertion can be performed. Other character insertion techniques will be known by or will occur to those skilled in the art.) Underflow may be indicated when the read address comes to within a second threshold of even greater closeness to the write address.

The (c) portion of FIG. 1 illustrates what happens if the write clock is faster than the read clock. In particular, the (c) portion of FIG. 1 shows that the number of as-yet-unread characters in FIFO 10 has risen above the baseline number. This is because the read address is falling farther behind the write address. Unless something is done, the FIFO will eventually become completely full (an overflow condition), which is generally regarded as unacceptable. Overflow occurs when the difference between the write address and the read address equals or is unacceptably close to equaling the number of storage locations 12 in FIFO 10. To prevent overflow, when the difference between the write address and the read address comes to within a first threshold of closeness to the number of storage locations 12, a dummy character (or characters) can be deleted from the incoming data stream, while changing of the write address is temporarily halted. (Again, this is just one example of how character deletion can be performed, and other character deletion techniques will be known by or will occur to those skilled in the art.) Overflow may be indicated when the difference between the write address and the read address comes to within a second threshold of even greater closeness to the number of storage locations 12 in FIFO 10.

Note that because the circuitry is set up to allow the delay (latency) between writing a character into FIFO 10 and subsequently reading that character from the FIFO to be as great as the maximum allowable difference between the write and read addresses (which maximum allowable difference is related to the number of locations 12 in the FIFO), the user of this circuitry must budget for this possible maximum amount of delay through the FIFO. Because in the general case either of the write and read clocks can be faster than the other, FIFO 10 must be relatively large to accommodate situations that tend either toward underflow ((b) portion of FIG. 1) or overflow ((c) portion of FIG. 1). This means that relatively large latency must be budgeted for FIFO 10. The present invention can be employed to ameliorate this problem.

Figure 2:
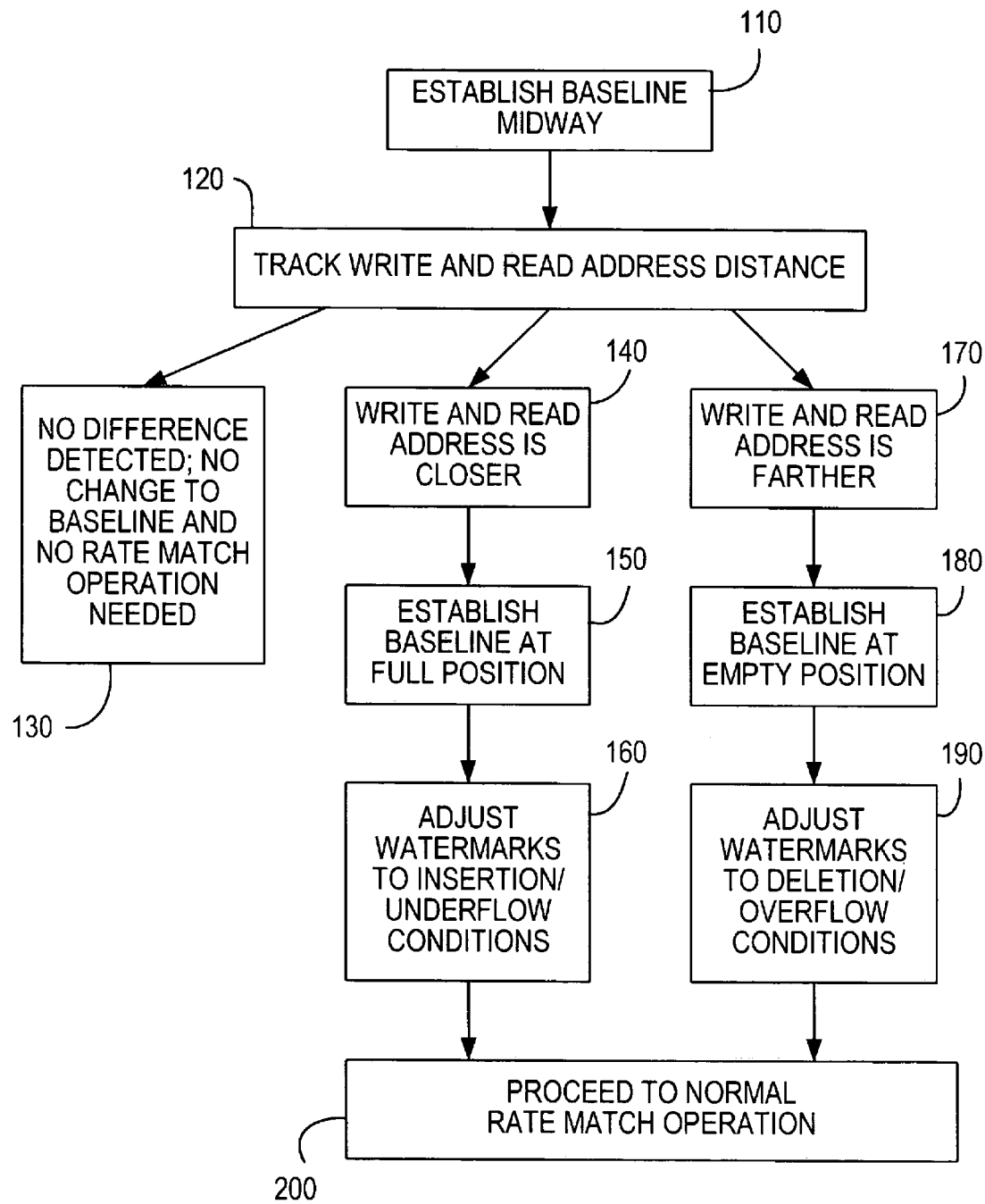
FIG. 2 is a simplified flow chart of an illustrative embodiment of certain aspects of the invention.

An illustrative method in accordance with the invention for determining how to operate satisfactorily with a considerably smaller FIFO 10' (e.g., as in FIGS. 3 and 4) is shown in FIG. 2. First, as a comparison between FIG. 1, on the one hand, and FIGS. 3 and 4, on the other hand, suggests, the invention can make use of a smaller FIFO 10' than would be required for a comparable range of performance capability in the prior art such as FIG. 1. For example, FIFO 10' can be approximately one-half the size of FIFO 10 with no loss of operational range. The starting point for the method of FIG. 2 can be such a reduced-size FIFO 10'.

(Up to this point in this discussion, we have spoken, for the most part, of various FIFO operations in terms of the "distance" between read and write addresses. FIG. 2 and some of the subsequent material and discussion herein refer to various "positions" in FIFOs. Those skilled in the art will appreciate that FIFOs can be arranged to operate either on the basis of distance between read and write addresses, or on the basis of particular positions. From the standpoint of this invention various approaches like these are equivalent. "Distance" and "location" terminology may therefore sometimes be mixed and/or used alternatively (equivalently) in what follows. Those skilled in the art will understand how to translate between the two. To amplify this point a bit more, an example of FIFO operation based on "distance" is the following. The FIFO is initially empty, and both the write and read pointers are pointing at the same location. To establish the initial baseline content of the FIFO, one can hold the read pointer and allow the write pointer to advance until the baseline (or baseline quantity of data) has been reached. Once the baseline has been reached, the read pointer is then allowed to advance. The FIFO is loaded with content in this case to reach the baseline. An alternative example of FIFO operation based on "position" is the following. The FIFO is initially empty, but the write and read pointers are offset at specific starting locations. Then both the write and read pointers are allowed to advance at the same time. Here the FIFO is not loaded with content before starting operation, but the data read from the FIFO does quickly become meaningful data. The "offset" mentioned a couple of sentences earlier equates to the baseline quantity of data. From these examples it will be seen how terms like "distance", "position", and "location" are alternative and therefore equivalent ways of expressing the same concepts, and that "baseline" generally refers to a nominal quantity of as-yet-unread data in a FIFO regardless of where in the FIFO that data is located and regardless of how the FIFO is set up to operate (e.g., whether on the basis of "distance", "position", "location", or any other similar principle).)

Figure 3:
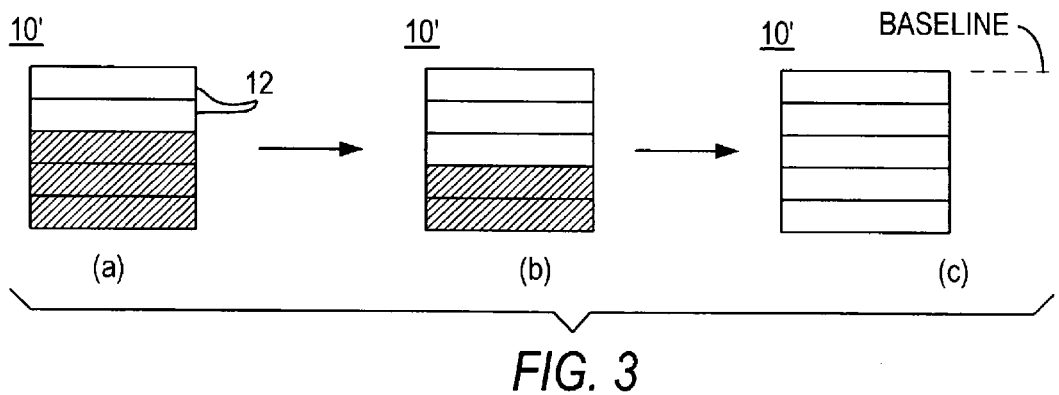
FIG. 3 is somewhat similar to FIG. 1, but is useful in explaining certain aspects of the invention.
Figure 4:
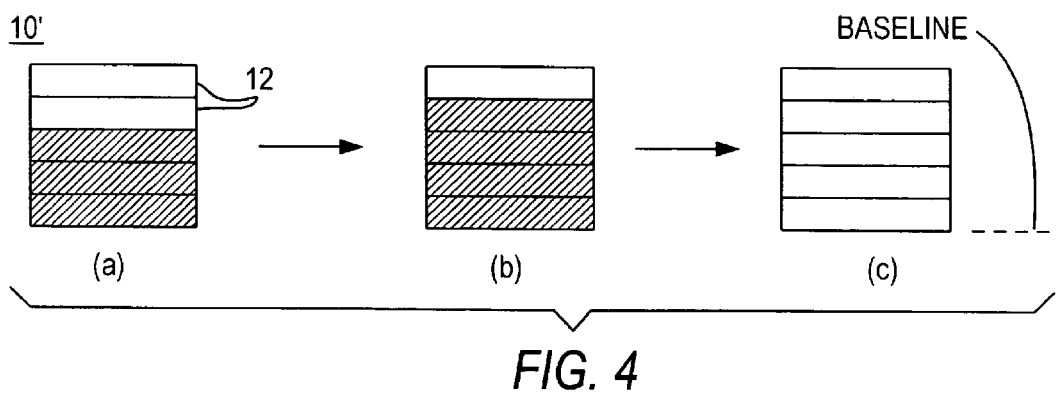
FIG. 4 is similar to FIG. 3, and is useful in explaining certain aspects of the invention under conditions that differ from those illustrated by FIG. 3.

Returning to specific consideration of FIG. 2, in step 110 a preliminary baseline is established in FIFO 10' at approximately the midpoint of its number of storage locations (see the (a) portions of FIGS. 3 and 4).

The FIFO is then allowed to operate while step 120 is performed to track the distance between the FIFO write and read addresses.

If step 120 does not detect any significant change in write and read address distance, control passes from step 120 to step 130. Step 130 allows FIFO 10' to operate as initially set up (i.e., with the baseline in the middle of the relatively small FIFO) because little or no rate matching activity is required. Indeed, if there is truly no change in write and read address distance detected by step 120, step 130 may allow FIFO 10' to be bypassed because no rate matching operation is needed at all. (Even if no rate matching is required, it may still be desired to keep FIFO 10' in the circuit if, for example, there is a phase difference between the read and write clocks and there is no other FIFO that does the phase compensation along the path.)

If step 120 detects that the distance between the write and read addresses is diminishing (e.g., as in the (b) portion of FIG. 3), control passes from step 120 to step 140, and then to step 150.

In step 150 the baseline of FIFO 10' is shifted toward or even to the full position (e.g., as shown in the (c) portion of FIG. 3). This may mean, for example, that whenever (during subsequent operation) the circuitry associated with FIFO 10' is able to or is called upon to adjust the quantity of as-yet-unread data in FIFO 10', that circuitry attempts to fill the FIFO (i.e., its new baseline) with such as-yet-unread data. This may be done with character insertion on the FIFO output while holding the read address unchanged (or by any other suitable technique) until the distance between the write and read addresses is once again the baseline distance (i.e., in this branch of the method, the full or nearly full condition of FIFO 10'). From step 150 control passes to step 160.

In step 160 the thresholds (or "watermarks") at which (1) character insertion is called for and/or (2) underflow is indicated may be adjusted. For example, because it is now known that the system being implemented tends toward underflow, the character insertion threshold may be increased (i.e., to a greater value of distance between write and read addresses) to reduce the risk of underflow actually occurring. Similarly, the threshold for indicating underflow may be somewhat increased to provide more warning that underflow is imminent.

From step 160 control passes to step 200, in which normal operation proceeds with FIFO 10' and its associated circuitry set up as per steps 140, 150, and 160, and as shown in part in the (c) portion of FIG. 3.

Considering now the final branch from step 120, if that step detects that the distance between write and read addresses is increasing (e.g., as in the (b) portion of FIG. 4), control passes from step 120 to step 170, and then to step 180.

In step 180 the baseline of FIFO 10' is shifted toward or even to the empty position (e.g., as shown in the (c) portion of FIG. 4). This may mean, for example, that whenever (during subsequent operation) circuitry associated with FIFO 10' is able to or is called upon to adjust the quantity of as-yet-unread data in FIFO 10', that circuitry attempts to empty the FIFO (i.e., to its new baseline) of as-yet-unread data. This may be done with character deletion on the FIFO input while holding the write address unchanged (or by any other suitable technique) until the distance between the write and read addresses is once again the baseline distance (i.e., in this branch of the method, relatively small, zero, or close to zero). From step 180 control passes to step 190.

In step 190 the thresholds (or "watermarks") at which (1) character deletion is called for and/or (2) overflow is indicated may be adjusted. For example, because it is now known that the system being implemented tends toward overflow, the character deletion threshold may be increased (i.e., to a greater value of distance between write and read addresses) to reduce the risk of overflow actually occurring. Similarly, the threshold for indicating overflow may be somewhat increased to provide more warning that overflow is imminent.

From step 190 control passes to step 200, in which normal operation proceeds with FIFO 10' and its associated circuitry set up as per steps 170, 180, and 190, and as shown in part in the (c) portion of FIG. 4.

Figure 5:
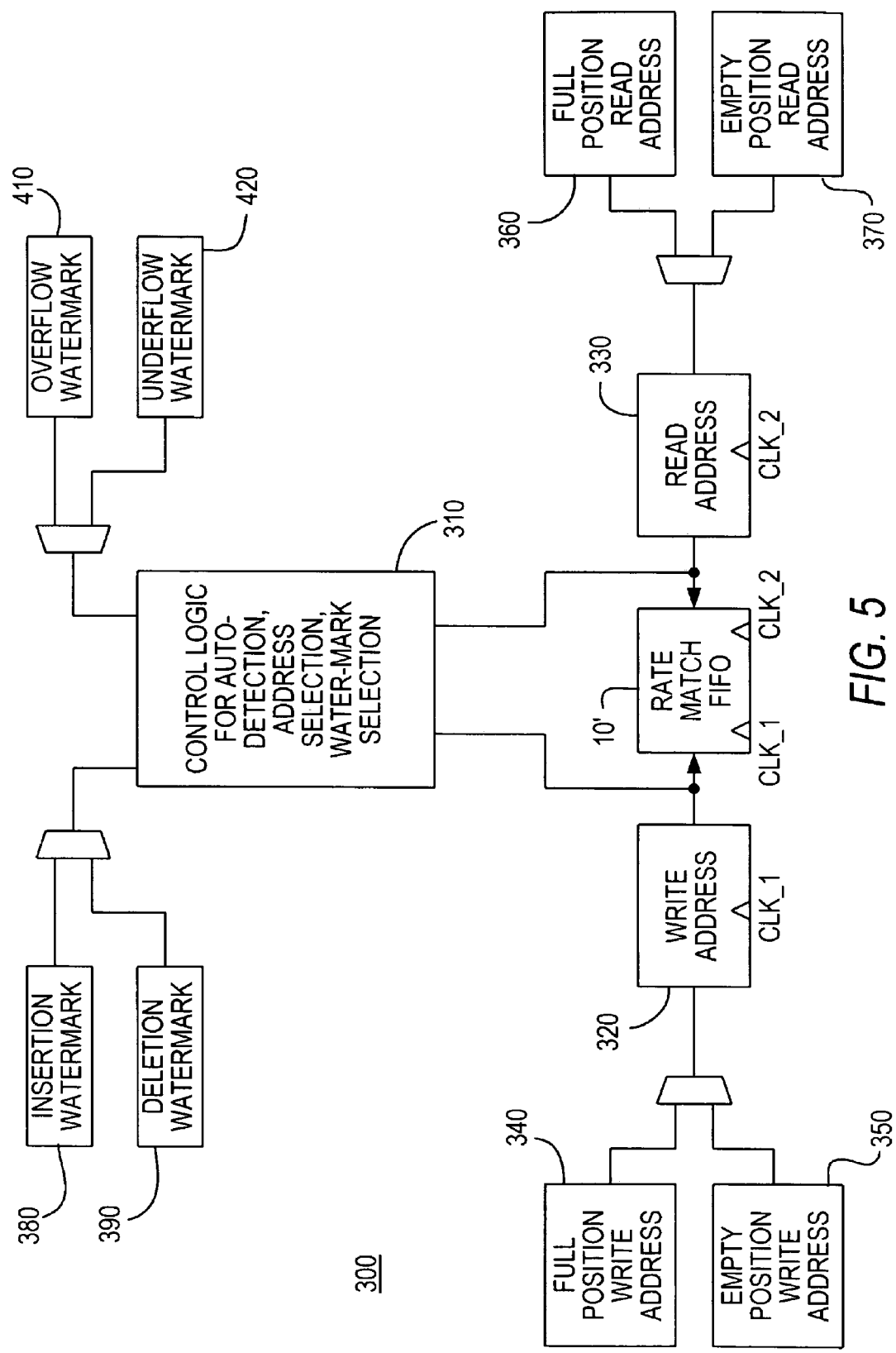
FIG. 5 is a simplified block diagram of an illustrative embodiment of circuitry (or circuitry in addition to what is shown in FIGS. 3 and 4) in accordance with the invention.

FIG. 5 shows an illustrative embodiment of circuitry 300 that may be associated with FIFO 10' in accordance with the invention. Circuitry 320 generates write addresses for application to FIFO 10'. Circuitry 330 generates read addresses for application to FIFO 10'. A so-called CLK__1 signal is applied to component 320 and the write side of component 10'. This is the write clock signal. A so-called CLK__2 signal is applied to component 330 and the read side of component 10'. This is the read clock signal.

Control logic 310 can carry out the steps of the methods of this invention (e.g., as shown in FIG. 2). For example, control logic 310 can detect which of the write and read clocks is faster. Control logic 310 can also select the write and read address limits that are to be used by components 320 and 330. For example, the highest and lowest write addresses to be used may be stored in registers 340 and 350, respectively. The highest and lowest read addresses to be used may be stored in registers 360 and 370. These values determine the size of FIFO 10'. They also effectively determine the location of the baseline. Assume, for example, that the baseline is always at a fixed address. Then the baseline can be effectively moved closer to the full position (e.g., portion (c) of FIG. 3) by moving the full position (340 and 360) down. FIFO 10' can be kept the same size by also moving the empty position (350 and 370) down by the same amount.

Conversely, the baseline can be effectively moved closer to the empty position (e.g., portion (c) of FIG. 4) by moving the empty position (350 and 370) up. Again FIFO 10' can be kept the same size by also moving the full position (340 and 360) up by the same amount.

Another function of control logic 310 is watermark selection. These are selection of the above-described thresholds for character insertion (stored in register 380), character deletion (stored in register 390), overflow indication (stored in register 410), and underflow indication (stored in register 420).

It will now be appreciated that the invention allows FIFO 10' to be smaller than prior art FIFO 10, with no loss of generality or range of operating capability. In each application of the circuitry, the invention initially determines which of the write and read clocks is faster. After that determination has been made, the invention effectively provides only the part of the FIFO (relative to the baseline) that will actually be needed to deal with the particular clock speed relationship that has been detected. FIFO capacity on the other side of the baseline does not need to be provided (or can at least be greatly reduced) because it is now known (from the initial relative clock speed determination) that it will not be needed. This makes it possible to reduce the size of the FIFO 10' that the user knows will be employed. This in turn makes it possible for the user to reduce the amount of latency that must be budgeted for the FIFO.

It will be understood that the foregoing is only illustrative of the principles of the invention, and that various modifications can be made by those skilled in the art without departing from the scope and spirit of the invention. For example, the sizes of the various FIFOs 10 and 10' shown herein are only simplified examples, and FIFOs of other sizes can be used instead if desired. Terms like write clock regime and read clock regime may sometimes be used as alternatives for the briefer write clock and read clock terms used for the most part in this specification.

The invention claimed is:

1. A method of operating First-In-First-Out (FIFO) memory circuitry on an integrated circuit, the FIFO memory circuitry being used for interfacing data between a write clock rate that the data had when received by the integrated circuit and a read clock rate at which the data will be further processed by the integrated circuit, the method comprising:
   determining which of the write clock rate and the read clock rate is faster;
   if the read clock rate is faster, then shifting a baseline of the FIFO memory circuitry toward a full position of that circuitry;
   if the write clock rate is faster, then shifting a baseline of the FIFO memory circuitry toward an empty position of that circuitry; and
   proceeding to normal rate match operation such that only a capacity of the FIFO memory circuitry on one side of the baseline is provided for storing the data being interfaced.

2. The method defined in claim 1 wherein if the read clock rate is faster, the baseline is shifted to the full position.

3. The method defined in claim 1 wherein if the write clock rate is faster, the baseline is shifted to the empty position.

4. The method defined in claim 1 wherein if the read clock rate is faster, then adjusting a threshold difference between FIFO read and write addresses at which data insertion is performed.

5. The method defined in claim 4 wherein the adjusting comprises increasing the threshold difference.

6. The method defined in claim 1 wherein if the read clock rate is faster, then adjusting a threshold difference between FIFO read and write addresses at which data underflow is indicated.

7. The method defined in claim 6 wherein the adjusting comprises increasing the threshold difference.

8. The method defined in claim 1 wherein if the write clock rate is faster, then adjusting a threshold difference between FIFO read and write addresses at which data deletion is performed.

9. The method defined in claim 8 wherein the adjusting comprises increasing the threshold difference.

10. The method defined in claim 1 wherein if the write clock rate is faster, then adjusting a threshold difference between FIFO read and write addresses at which data overflow is indicated.

11. The method defined in claim 10 wherein the adjusting comprises increasing the threshold difference.

12. A method of operating First-In-First-Out (FIFO) memory circuitry that is used for interfacing data between write and read clock regimes comprising:
   establishing a baseline in the FIFO memory such that approximately half the FIFO memory locations are expected to contain data in transit between the write and read clock regimes;
   monitoring distance between write and read addresses of the FIFO memory to determine whether that distance is within a first threshold of closeness to zero or within a second threshold of closeness to the full capacity of the FIFO memory;
   if the distance is within the first threshold of closeness to zero, then shifting the baseline toward a full condition of the FIFO memory;
   if the distance is within the second threshold of closeness to the full capacity of the FIFO memory, then shifting the baseline toward an empty condition of the FIFO memory; and
   proceeding to normal rate match operation such that only a capacity of the FIFO memory circuitry on one side of the baseline is provided for storing the data in transit.

13. The method defined in claim 12 wherein if the distance is within the first threshold of closeness to zero, then shifting the baseline to the full condition of the FIFO memory.

14. The method defined in claim 12 wherein if the distance is within the second threshold of closeness to the full capacity of the FIFO memory, then shifting the baseline to the empty condition of the FIFO memory.

15. A method of configuring First-In-First-Out (FIFO) memory circuitry that is used for interfacing data between write and read clock regimes comprising:
   monitoring difference between write and read addresses in the FIFO memory circuitry during operation of that circuitry;
   if the difference is within a first threshold of closeness to zero, then shifting a baseline of the FIFO memory circuitry, which baseline corresponds to a desired amount of data that has been written into the FIFO memory circuitry but that has not yet been read from that circuitry, toward a full condition of the FIFO memory circuitry; and
   if the difference is within a second threshold of closeness to the full capacity of the FIFO memory, then shifting the baseline toward an empty condition of the FIFO memory circuitry; and
   proceeding to normal rate match operation such that only a capacity of the FIFO memory circuitry on one side of the baseline is provided for storing the data being interfaced.

16. The method defined in claim 15 wherein if the difference is within the first threshold of closeness to zero, then shifting the baseline to the full condition of the FIFO memory circuitry.

17. The method defined in claim 15 wherein if the difference is within the second threshold of closeness to the full capacity of the FIFO memory, then shifting the baseline to the empty condition of the FIFO memory circuitry.

* * * * *